(12) United States Patent
Mahapatra et al.

(10) Patent No.: US 11,632,346 B1
(45) Date of Patent: Apr. 18, 2023

(54) SYSTEM FOR SELECTIVE PRESENTATION OF NOTIFICATIONS

(71) Applicant: AMAZON TECHNOLOGIES, INC., Seattle, WA (US)

(72) Inventors: Abinash Mahapatra, Cupertino, CA (US); Anuj Saluja, Newark, NJ (US); Ouning Zhang, Sunnyvale, CA (US); Xinyu Miao, San Mateo, CA (US); Ting Liu, Sunnyvale, CA (US); Yanina Potashnik, Palo Alto, CA (US); Alfred Ying Fai Lui, San Jose, CA (US); Choon-Mun Hooi, Redwood City, CA (US); Jeffrey John Easter, San Francisco, CA (US); Oliver Huy Doan, Irvine, CA (US); Jonathan B. Assayag, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/712,761

(22) Filed: Dec. 12, 2019

Related U.S. Application Data

(60) Provisional application No. 62/905,572, filed on Sep. 25, 2019.

(51) Int. Cl.
| | | |
|---|---|---|
| *H04L 12/58* | (2006.01) | |
| *G06F 3/0484* | (2022.01) | |
| *G06F 8/38* | (2018.01) | |
| *G06F 9/445* | (2018.01) | |
| *G06F 9/451* | (2018.01) | |
| *H04L 51/224* | (2022.01) | |
| *H04R 1/02* | (2006.01) | |
| *G06F 3/01* | (2006.01) | |
| *G10L 25/78* | (2013.01) | |

(Continued)

(52) U.S. Cl.
CPC ............ *H04L 51/224* (2022.05); *G06F 3/011* (2013.01); *G06F 3/165* (2013.01); *G10L 13/00* (2013.01); *G10L 25/78* (2013.01); *H04R 1/028* (2013.01)

(58) Field of Classification Search
CPC .......... H04L 51/24; G06F 3/011; G06F 3/165; G10L 25/78; H04R 1/028
See application file for complete search history.

(56) References Cited

U.S. PATENT DOCUMENTS

| | | | | |
|---|---|---|---|---|
| 10,140,973 | B1 * | 11/2018 | Dalmia | ................... G10L 15/26 |
| 10,158,639 | B1 * | 12/2018 | Goben | .................... H04L 63/10 |
| 10,623,843 | B1 * | 4/2020 | Jorgovanovic | ....... H04R 1/1016 |

(Continued)

*Primary Examiner* — Christopher B Robinson
(74) *Attorney, Agent, or Firm* — Lindauer Law, PLLC

(57) ABSTRACT

A device, such as a head-mounted wearable device (HMWD), provides audible notifications to a user with a voice user interface (VUI). A filtered subset of notifications addressed to the user, such as notifications from contacts associated with specified applications, are processed by a text to speech system that generates audio output for presentation to the user. The audio output may be presented using the HMWD. For example, the audio output generated from a text message received from a contact may be played on the device. The user may provide an input to play the notification again, initiate a reply, or take another action. The input may comprise a gesture on a touch sensor, activation of a button, verbal input acquired by a microphone, and so forth.

24 Claims, 7 Drawing Sheets

(51) Int. Cl.
*G06F 3/16* (2006.01)
*G10L 13/00* (2006.01)

(56) References Cited

U.S. PATENT DOCUMENTS

| | | | |
|---|---|---|---|
| 2011/0246200 A1* | 10/2011 | Song | G10L 13/07 |
| | | | 704/260 |
| 2012/0308229 A1* | 12/2012 | Bahr | H04B 10/114 |
| | | | 398/119 |
| 2013/0085761 A1* | 4/2013 | Bringert | H04M 1/724 |
| | | | 704/E21.001 |
| 2014/0160250 A1* | 6/2014 | Pomerantz | H04N 5/23218 |
| | | | 348/222.1 |
| 2015/0334218 A1* | 11/2015 | Jacobsen | G06F 3/14 |
| | | | 455/420 |
| 2016/0164820 A1* | 6/2016 | Faaborg | H04L 51/42 |
| | | | 709/206 |
| 2016/0247480 A1* | 8/2016 | Li | G02B 27/017 |
| 2016/0379638 A1* | 12/2016 | Basye | G10L 15/22 |
| | | | 704/235 |
| 2017/0085678 A1* | 3/2017 | Babu | H04L 67/306 |
| 2017/0337045 A1* | 11/2017 | Hills | G06F 9/451 |
| 2018/0176186 A1* | 6/2018 | Chao | H04L 63/1425 |
| 2018/0286424 A1* | 10/2018 | Fadell | G10L 21/0224 |
| 2020/0120727 A1* | 4/2020 | Batta | H04W 76/14 |

* cited by examiner

SYSTEM FOR SELECTIVE PRESENTATION OF NOTIFICATIONS

PRIORITY

This application claims priority to, and the benefit of, U.S. Patent Application Ser. No. 62/905,572 filed on Sep. 25, 2019, titled "SYSTEM FOR PRESENTATION OF NOTIFICATIONS USING WEARABLE DEVICE", the contents of which are hereby incorporated by reference into the present disclosure.

BACKGROUND

Various devices, including wearable devices, provide many benefits to users, allowing easier and more convenient access to information and services. Wearable devices may provide output that is presented to the user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
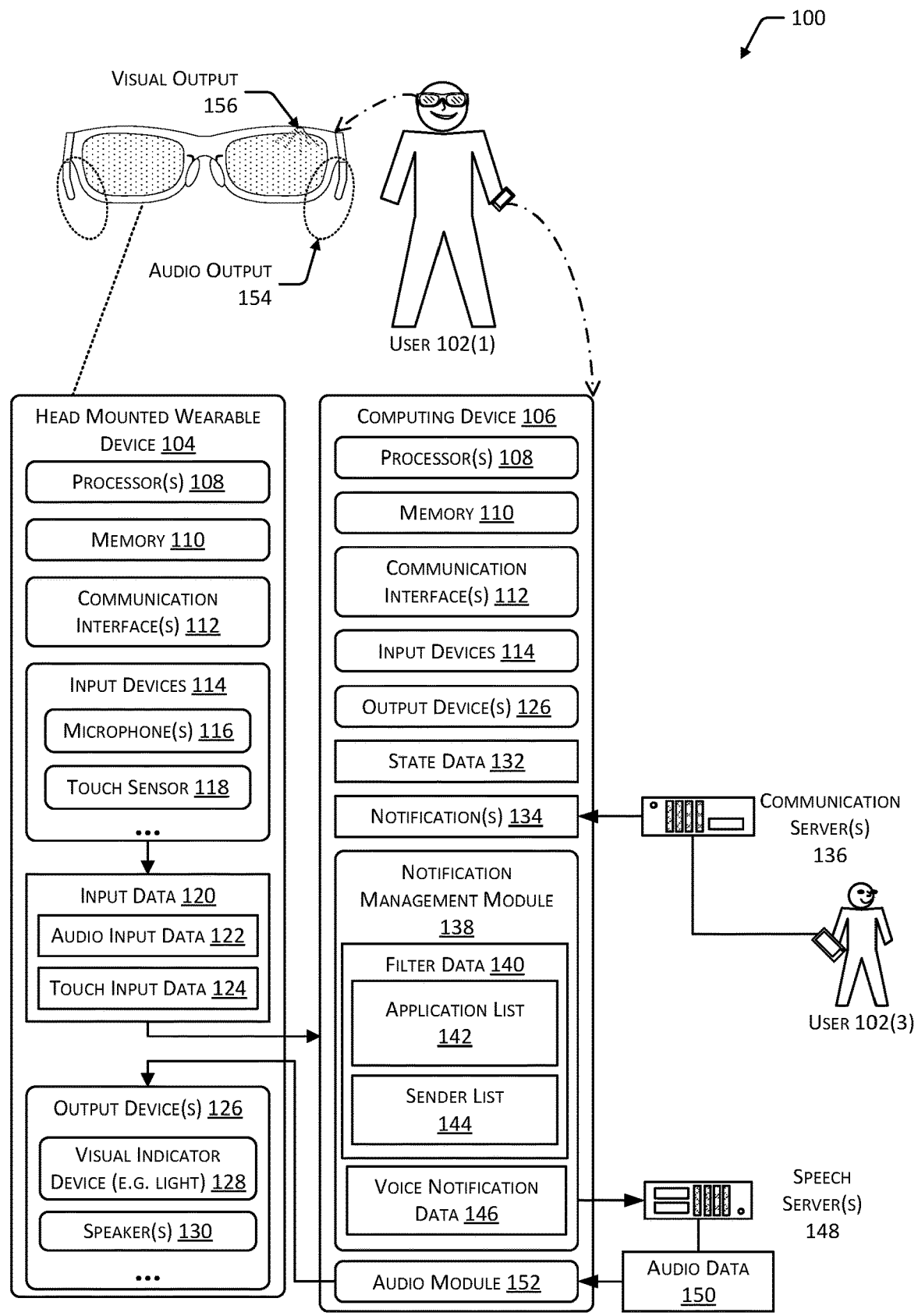
FIG. 1 depicts a system for selectively presenting output based on notifications to a user, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

The structures depicted in the following figures are not necessarily according to scale. Furthermore, the proportionality of one component to another may change with different implementations. In some illustrations the scale or a proportionate size of one structure may be exaggerated with respect to another to facilitate illustration, and not necessarily as a limitation.

DETAILED DESCRIPTION

Wearable devices provide many benefits to users, allowing easier and more convenient access to information and services. For example, a head-mounted wearable device (HMWD) having a form factor that is ubiquitous and easily worn, such as eyeglasses, may facilitate access to information. This information includes notifications to be presented to the user. Output based on notifications may become distracting as the user is presented with information that is not needed or desired. For example, the user may find it distracting to have a sound presented by the HMWD for every incoming email, text message, and so forth. The situation may become even more distracting if the contents are presented as well. Continuing the example, if the message contents of every incoming email, text message, and so forth were read aloud to the user, the user may be unable to carry on a conversation with someone else.

Described in this disclosure are devices and techniques that allow a user to control the presentation of output that is based on notifications on a device such as a HMWD, an internet enabled speaker, and so forth. A first device, such as the HMWD, may be in communication with a second device, such as a smartphone. The second device may process notifications and determine which of those notifications should be presented by the first device. The notifications may be locally generated or received from an external source, such as a communication server.

A notification may be parsed to determine specific information, such as an application associated with the notification, the sender of the notification, and message data associated with the notification. The parsed notifications are then processed to determine which should be presented to the user. In some implementations, some notifications may be omitted from parsing. For example, preprocessing may remove status notifications about current battery charge levels so that they are not parsed or subsequently processed.

The parsed notifications are filtered. In one implementation, the parsed notifications may be filtered by one or more attributes, such as application and sender. For example, an application list may designate which applications are permitted to send notifications to the HMWD. Continuing the example, a sender list may designate which senders are permitted to send notifications to the HMWD. Only those notifications associated with an application designated in the application list and having a sender designated in the sender list are processed further.

In another implementation, the parsed notifications may be filtered using a machine learning system to determine a notification value. If the notification value exceeds a threshold value, then the notification may be processed further.

The filtered notifications are processed to determine voice notification data. For example, the voice notification data may include a text version of a phrase that is to be presented as speech to the user. The voice notification data may include information such as a nature of the notification, name of the associated application, a name associated with the sender, message data, and so forth. For example, the voice notification data may comprise text such as "Jeff has sent you an instant message that reads "where would you like to go for lunch?""

The voice notification data is used to generate speech. In one implementation, the voice notification data may be processed by a text to speech (US) system executing on the smartphone. In another implementation, the voice notification data may be sent to a speech server. The speech server may then generate audio data, such as a WAV file.

The audio data may then be provided to the HMWD or other device for presentation of audio output. Continuing the example, the WAV file may be presented by a speaker, allowing the user to hear output based on the notification.

The user may provide a reply or other response to output from a notification. For example, the system may present the audio data associated with the notification. A reply to the notification may be initiated responsive to input from the user. Continuing the example, the user may use a touch sensor on the HMWD to provide touch input that initiates a reply. A microphone on the HMWD may be operated to acquire audio input data of the user speaking their reply. The acquired audio input data may be converted to text using an automated speech recognition system, with the resulting input text sent to the sender.

The user may also take other actions associated with the notification. For example, the user may provide a touch or verbal input to stop presentation of output that is based on a notification, repeat the presentation, and so forth.

The system may also provide dynamic presentation which reduces the presentation of redundant or unnecessary information to the user. For example, a first and second notification from the same sender are received within a threshold time of one another. Presentation of output based on the first notification includes the sender's name while a presentation of output based on the second notification omits the sender's name.

In some situations, other output devices may be used to inform the user about the notification. For example, the HMWD may include a light emitting diode (LED), liquid crystal, or other visual indicator device. The LED may be illuminated with a particular color, intensity, illumination pattern, and so forth to convey information about the notification such as priority or sender.

By utilizing the devices and techniques described in this disclosure, information about notifications may be presented to the user of the HMWD in a way that reduces distractions. The user is presented with output based those notifications that are deemed to be worthy of the user's attention. This improves the overall attentiveness of the user by preventing unnecessary distractions. Operation of the HMWD may be also improved by reducing the output presented, thus reducing consumption of power from an onboard battery. This reduced power consumption extends the operating time of the HMWD between subsequent charges of the onboard battery.

Illustrative System

FIG. 1 depicts a system 100 for selectively presenting output based on notifications to a user 102, according to some implementations. In this illustration, the user 102 is wearing on their head a head-mounted wearable device (HMWD) 104 in a general form factor of eyeglasses. The HMWD 104 may incorporate hinges to allow the temples of the eyeglasses to fold. The HMWD 104 may include one or more lenses. The lenses may be shaped to provide a particular refractive effect on light rays, such as in the case of prescription lenses.

The HMWD 104 may be in communication with one or more affiliated computing devices 106. For example, the HMWD 104 may communicate with the computing device 106 using a wireless network, such as Bluetooth. The computing device 106 may be used at least in part to provide additional resources, such as access to the network, compute resources, storage, display output, and so forth. The computing device 106 may comprise a smart phone, tablet, local server, in-vehicle computer system, and so forth. For example, the computing device 106 may comprise a smart phone that includes a display. The display of the smart phone may be used to present a graphical user interface.

The HMWD 104 may include one or more hardware processors 108 (processors) configured to execute one or more stored instructions. The processors 108 may comprise one or more cores. The processors 108 may include general purpose microprocessors, microcontrollers, application specific integrated circuits (ASICs), digital signal processors (DSPs), and so forth.

The HMWD 104 includes one or more memories 110. The memory 110 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 110 provides storage of computer-readable instructions, data structures, program modules, and other data for the operation of the HMWD 104. Modules shown may be stored in the memory 110 and executed by the processor 108, implemented in hardware, firmware, or as a system on a chip (SoC), or any combination thereof.

The HMWD 104 may include one or more communication interfaces 112 that provide communication between the HMWD 104 and other devices, such as the computing device 106, servers, and so forth. The communication interfaces 112 may include devices to connect to myogram, respirometer, and so forth. Biomedical data may be acquired by the biomedical sensors.

The input devices 114 may be used to acquire input data 120. For example, the microphone 116 may be used to acquire audio input data 122 of the user 102 speaking. In another example, the touch sensor 118 may be used to acquire touch input data 124 indicative of the user 102 moving their finger on the touch sensor 118.

The HMWD 104 may include one or more output devices 126. The output devices 126 may include, but are not limited to, a visual indicator device 128, a speaker 130, and so forth. The visual indicator device 128 may comprise one or more of a light emitting diode (LED), an electroluminescent light, a fluorescent light, an incandescent light, a quantum dot, a laser, a liquid crystal element, a microelectromechanical device, an electrophoretic element, a cholesteric element, an interferometric element, and so forth. In some implementations the visual indicator device 128 may be operable to provide different outputs, such as by presenting a particular color.

The speaker 130 may comprise one or more of an air conduction speaker (ACS) or a bone conduction speaker (BCS). The ACS is designed to produce vibrations in the surrounding air. For example, the ACS may comprise a diaphragm that is moved to generate sound waves in the air. The ACS may use one or more mechanisms to generate sound waves. These mechanisms may include, but are not limited to: voice coils, piezoelectric elements, metallic ribbon elements, magnetostrictive elements, electrostatic elements, and so forth. The ACS may operate to produce sound between 500 Hertz (Hz) and 20 kHz. For example, the ACS may comprise the Cobra electrodynamic transducer model number 2403-260-0091 from Knowles Electronics, LLC. of Itasca, Ill., United States of America.

A BCS may be emplaced to come into contact with a portion of a head of the user 102, such as on a temple of an eyeglass form factor. A movable element of the BCS may be in mechanical contact with the head of the user 102 and produces BCS audio output that is physical displacement or vibrations in the head of the user 102. These vibrations are then perceived as sound by the ear of the user 102. In one implementation, the BCS may comprise a piezoelectric material that, upon application of a voltage, physically changes shape. In another implementation, the BCS may comprise an electromagnet that, upon application of a voltage, moves a core.

The computing device 106 may also include one or more processors 108, memories 110, communication interfaces 112, input devices 114, or output devices 126. The capabilities of these may vary with respect to the HMD 104. For example, the computing device 106 may include memory 110 with greater storage capacity than the memory 110 of the HMWD 104.

The computing device 106 may use a communication interface 112 to maintain communication with the HMWD 104. For example, the computing device 106 may use a Bluetooth Low Energy interface to maintain communication with the HMWD 104. Likewise, a WiFi network interface may be used to maintain communication with a network, such as the Internet.

The computing device 106 may maintain state data 132. The state data 132 provides information indicative of or associated with operation of one or more devices or applications executing on the computing device 106, the HMWD 104, or other devices such as external servers in communication with the computing device 106. For example, the computing device 106 may receive data from the HMWD 104 that indicates the microphone 116 on the HMWD 104 is acquiring audio input data 122. In another example, the state data 132 may indicate that a real time call (RTC) is in progress. In yet another example, the state data 132 may indicate that the user 102 has been deemed to be speaking, such as in a conversation.

Notifications 134 may be received from modules executing on the computing device 106 or outside the computing device 106. For example, local notifications may be generated by a service module that provides information about operation or status of various systems on the computing device 106. Notifications 134 may be received from the external device, such as a communication server 136, or may be generated responsive to information from the external device. For example, user 102(2) may send an SMS message to user 102(1) that results in data being sent to the communication server 136. The communication server 136 may send a notification 134 based on the SMS message to the computing device 106 associated with the user 102(1). The computing device 106 may then process the notification 134.

A notification management module 138 processes the notifications 134 and determines which should be presented to the user 102. The notification management module 138 may filter the notifications 134 using filter data 140. For example, the filter data 140 may comprise an application list 142 and a sender list 144. The application list 142 designates which applications are permitted to present output about a notification 134 to the user 102. For example, the user 102 during setup may specify that an SMS messaging application is allowed to provide information about notifications 134 to the user 102. The sender list 144 designates which senders are permitted to present output about the notification 134 to the user 102. For example, the sender list 144 may comprise phone numbers, network addresses, email addresses, and so forth obtained from or stored in a contact or address list. The notification management module 138 may use the filter data 140 to determine voice notification data 146 for those notifications 134 containing information that is to be presented to the user 102. Operation of the notification management module 138 is discussed in more detail below.

The voice notification data 146 comprises text that is suitable for use in generating audible output. The voice notification data 146 may comprise text that is suitable for processing by a text to speech (US) system. For example, the voice notification data 146 may include a text version of a phrase that is to be presented as speech to the user 102. The voice notification data 146 may include information such as a nature of the notification 134, name of the associated application, a name associated with the sender, message data, and so forth.

The US system may execute locally on the computing device 106 or on another device, such as a speech server 148. In the implementation using the speech server 148, the computing device 106 may send the voice notification data 146 to the speech server 148 which then provides audio data 150 that is based on the voice notification data 146. For example, the speech server 148 may use voice synthesis to generate a WAV file that, when presented, comprises a synthesized voice that reads out the text in the voice notification data 146.

The computing device 106 may include an audio module 152 that is used to handle the audio data 150. For example, the audio module 152 may access the audio data 150 that has been received from the speech server 148 and send that audio data 150 to the HMWD 104 with instructions for the audio data 150 to be presented using the speakers 130.

The system 100 may be responsive to input from the user 102. For example, the user 102 may provide one or more of audio input from speech acquired by the microphone 116 or touch input from manipulating the touch sensor 118. In some implementations the user 102 may be presented with an indication that a notification 134 is pending. For example, an audio clip of a sound effect may be played on the speaker 130, the visual indicator device 128 may flash a light, and so forth. The user 102 may then provide input, such as a swipe of their finger which provides touch input data 124. Responsive to the input, an action may be performed, such as presenting at least a portion of the audio data 150. Other inputs may be used to initiate other actions. For example, input data 120 may be associated with stopping presentation of the audio data 150, presenting the audio data 150 again, sending a reply, muting output based on all further notifications 134, unmuting output based on notifications 134, and so forth. Continuing the example, responsive to input data 120 to stop presentation, the computing device 106 may send a command to the HMWD 104 to stop presentation of the audio data 150.

In some implementations, the computing device 106 may be omitted and the HMWD 104 may perform all of the functions described with regard to the HMWD 104 and the computing device 106. For example, the HMWD 104 may include the notification management module 138, the audio module 152, and so forth. In other implementations other arrangements of devices and functions may be used. For example, the notification management module 138 may operate on a server that is external to the HMWD 104.

The devices described herein may include other components that are not shown. For example, one or more of the HMWD 104 or the computing device 106 may include a battery, wireless power receiver, fuel cell, photovoltaic cell, or other source of electrical power. In another example, the devices may include one or more clocks to provide information indicative of date, time, ticks, and so forth.

Figure 2:
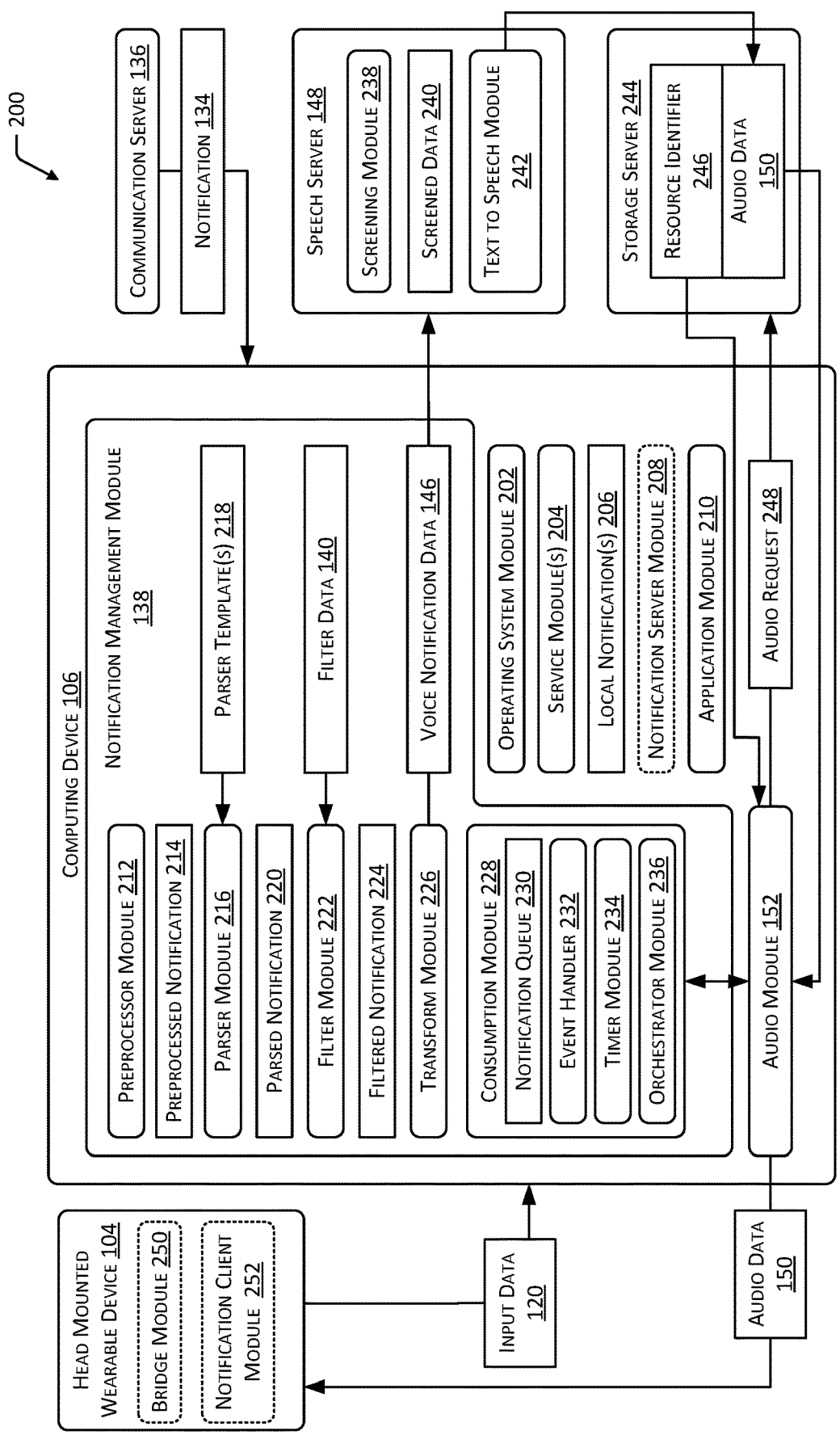
FIG. 2 depicts a block diagram 200 of a notification management module, according to some implementations.

FIG. 2 depicts a block diagram 200 of the notification management module 138, according to some implementations.

The following modules may be stored at least in part in the memory 110 of the computing device 106. These modules may be executed as foreground applications, background tasks, daemons, and so forth. The memory 110 may also include a data store, such as a flat file, database, linked list, tree, executable code, script, or other data structure to store information.

The computing device 106 may include an operating system (OS) module 202. The OS module 202 is configured to manage hardware resource devices such as input/output (I/O) interfaces, the input devices 114, the output device 116, the communication interfaces 112, and provide various services to applications or modules executing on the processors 108. For example, the OS module 202 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

A service module 204 may provide one or more services associated with operation of the computing device 106. For example, a power management service module may manage system resources according to available battery power, a Bluetooth service may handle communications compatible with the Bluetooth protocol, and so forth.

Local notifications 206 may be produced by the computing device 106. For example, the power management service module may generate local notifications 206 at a predetermined schedule, such as every 60 seconds, that report a current battery charge level of the computing device's 106 battery.

In some implementations, the computing device 106 may execute a notification server module 208. The notification server module 208 may provide various functions, such as allowing other services or applications to subscribe to receive notifications, and subsequently to push notifications to those subscribers. Operation of the notification server module 208 is discussed in more detail with respect to FIG. 4.

An application module 210 may provide various functions. For example, application modules 210 may provide functionality such as telephone calling using a cellular data network, voice over internet protocol (VOIP) calling, SMS messaging, text messaging, Internet browsing, and so forth.

The computing device 106 may execute the notification management module 138. The notification management module 138 may include a preprocessor module 212 that provides as output preprocessed notification(s) 214. The preprocessor module 212 may be configured to provide an initial filter of notifications 134 including local notifications 206. The preprocessor module 212 may process the incoming notifications 134 from external devices or local notifications 206 to remove notifications that are deemed to not be suitable for presentation using the HMWD 104. For example, the preprocessed notifications 214 may omit notifications from the power management service module about battery charge status.

In some implementations the preprocessor module 212 may use notification blocking data to determine the notifications to omit from further processing. These may include a first service module 204 executing at least in part on the computing device 106, the operating system module 202 executing at least in part on the computing device 106, repeated notifications by a second service module 204 executing on the computing device 106, and so forth. Continuing the example, the second service module 204 may be determined for blocking if it is associated with producing a count of messages per unit time that exceeds a threshold value. For example, if the second service module 204 provides 30 local notifications 206 per minute, and the threshold is 1 notification per minute, the local notifications 206 associated with the second service module 204 may be blocked by the preprocessor module 212.

A parser module 216 may receive as input one or more of the notifications 134, local notifications 206, or the preprocessed notifications 214. The parser module 216 may use one or more parser templates 218 to provide parsed notification(s) 220. The parser module 216 determines specific information from the notifications for further use. The parser templates 218 may provide information about the location, format, payload, and so forth that is contained within a notification 134. For example, a parser template 218 may be associated with a particular service module 204, application module 210, or type of notification produced therefrom. The parser module 216 may use this information to generate parsed notifications 220. In some implementations, the parsed notifications 220 may comprise the preprocessed notification 214 that has been annotated using the parser template 218, such as that specific data within the notification 134 is annotated for later use.

A filter module 222 receives as input the parsed notifications 220 and uses the filter data 140 to determine filtered notifications 224. As described above with regard to FIG. 1, the filter data 140 may comprise one or more of an application list 142 or a sender list 144. The filter data 140 may include one or more of type of notification, message keywords, date and time limits, and so forth. For example, the filter data 140 may indicate notifications are permitted to pass that include the word "emergency" in the message.

A transform module 226 receives as input the filtered notifications 224 and provides as output the voice notification data 146. The transform module 226 may process the filtered notifications 224 to provide a text version of a phrase that is to be presented as speech to the user 102. For example, the transform module 226 may determine from the filtered notification 224 the application module 210 that provided the notification 134, name associated with the sender, and message data associated with a filtered notification 224. The transform module 226 may use this data to construct a text string that is then used to generate speech. For example, the voice notification data 146 may comprise text such as "Jeff has sent you an instant message that reads 'where would you like to go for lunch?'"

Figure 3:
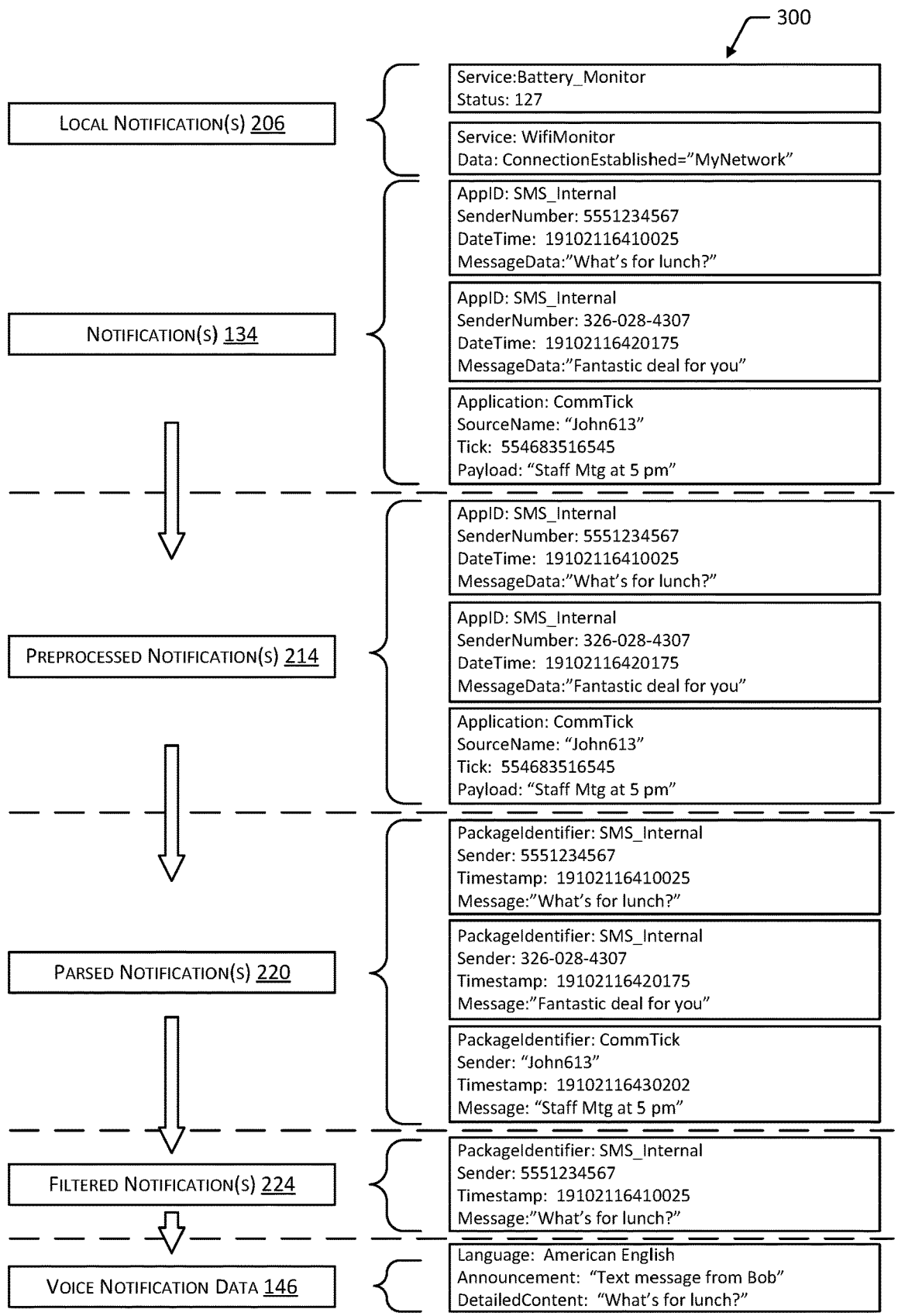
FIG. 3 depicts a scenario in which notifications are processed, according to some implementations.

Examples of notifications and their processing are described in more detail with regard to FIG. 3.

The notification management module 138 may send the voice notification data 146 to a speech server 148 as shown in FIG. 2 or a speech module on the computing device 106 (not shown). The speech server 148 may include a screening module 238 that accepts as input the voice notification data 146 and provides screened data 240 as output. The screening module 238 may process the voice notification data 146 to determine and remove or replace words or commands that are deemed to be unsuitable for production of speech. For example, the screening module 238 may remove profanity from the voice notification data 146. In another example, the screening module 238 may remove metadata or commands within the voice notification data 146 that would result in a disallowed operation. For example, the screening module 238 may access a data store that includes a first set of one or more words that are disallowed. The screening module 238 may accept the voice notification data 146 as input and determine that one or more words in the first set are present in the voice notification data 146. The screened data 240 may be generated by removing the one or more words from the voice notification data 146.

The speech server 148 may include a text to speech module 242 that accepts the screened data 240 as input and provides audio data 150 as output. For example, the text to speech module 242 may use a computer synthesized voice, a sampled human voice, or a combination thereof to provide audio data 150 that is a digital representation of speech that is based on the screened data 240.

In the implementation shown here, the audio data 150 may be sent to a storage server 244 for later retrieval. A resource identifier 246 may be associated with the audio data 150. For example, the resource identifier 246 may comprise a uniform resource locator (URL), serial number, token, or other data that allows the particular audio data 150 to a particular memory location allowing retrieval at a later time. In another implementation, the audio data 150 may be returned to the computing device 106 (not shown).

The audio module 152 of the computing device may receive data indicative of the resource identifier 246. The audio module 152 may send an audio request 248 to the storage server 244 with the resource identifier 246. The storage server 244 may use the resource identifier 246 to retrieve the particular audio data 150, which is then sent to the audio module 152 of the requesting computing device 106.

The consumption module 228 may operate in conjunction with the audio module 152 to present the audio data 150. For example, the audio data 150 may be sent to the HMWD 104 with instructions to present the audio data 150 using one or more of the speakers 130 on the HMWD 104. The consumption module 228 may then operate to coordinate sending the audio data 150 to the HMWD 104 for presentation.

The notification management module 138 may also include a consumption module 228. The consumption module 228 perform several functions associated with the notifications 134. The consumption module 228 may maintain a notification queue 230. In one implementation the notification queue 230 may comprise a first in, first out (FIFO) queue of filtered notifications 224. In another implementation the notification queue 230 may prioritize filtered notifications 224. For example, notifications associated with a particular sender in the sender list 144 may be moved to a head of the queue for processing before other filtered notifications 224 in the queue. The transform module 226 may accept as input the enqueued filtered notifications 224.

The consumption module 228 may include an event handler 232 that accepts the input data 120 as input. The event handler 232 may determine an action, if any, that is associated with particular input data 120. For example, touch input data 124 associated with a swipe along the touch sensor 118 in a particular direction may be associated with an action to replay output based on a notification. The event handler 232 may change the contents of the notification queue 230. For example, a gesture to repeat output based on a notification may result in the previously presented notification being placed at the head of the notification queue 230, or may direct the audio module 152 to repeat presentation of the audio data 150.

The consumption module 228 may include a timer module 234. The timer module 234 may be used to determine timing associated with notifications 134 and the presentation of output based on them. For example, the timer module 234 may determine whether two filtered notifications 224 have respective times that are within a threshold time of one another. Based on this determination, the transform module 226 may be directed to perform dynamic presentation and reduce or eliminate presentation of repetitive information in successive notifications. In another example, the timer module 234 may operate a timer with respect to the presentation of the audio data 150 to determine if input data 120 is associated with the audio data 150 being presented or has been presented within a threshold time.

The consumption module 228 may include an orchestrator module 236 that coordinates changes to the notification queue 230, operation of the event handler 232, the timer module 234, and so forth. For example, the orchestrator module 236 may reset timers, control at least a portion of the operation of other modules including, but not limited to, the preprocessor module 212, the parser module 216, the filter module 222, the transform module 226, and so forth.

In some implementations the HMWD 104 may include a bridge module 250 and a notification client module 252. The bridge module 250 may pass data between the notification client module 252 and one or more of the application module 210 or the audio module 152. The notification client module 252 may pass the data between the bridge module 250 and the notification server module 208. Operation of these modules is discussed in more detail with respect to FIG. 4.

FIG. 3 depicts a scenario 300 in which notifications 134 and local notifications 206 are processed, according to some implementations. This scenario 300 may be implemented at least in part by the devices and modules described in FIGS. 1 and 2.

In this illustration, five notifications are shown, two local notifications 206 and three notifications from some application modules 210s. Presentation of output based on all of these notifications to the user 102 would be distracting and eventually counterproductive as the user 102 may begin to ignore future presentations.

The preprocessed notifications 214 resulting from operation of the preprocessor module 212 are shown, in which the local notifications 206 associated with the "Battery_Monitor" service module 204 and the "WifiMonitor" service module 204 have been omitted. These preprocessed notifications 214 are then processed by the parser module 216 to determine the parsed notifications 220. The use of the parser templates 218 associated with the respective service modules 204 or application modules 210 may provide parsed notifications 220 in which the data used for subsequent processing has been determined. For example, in this illustration the parsed notifications 220 use common field designators and the data for a given field has been standardized to a common format.

The parsed notifications 220 are filtered to provide in this example a single filtered notification 222. For example, the filtered notification 222 is associated with an application module 210 designated in the application list 142 and a sender that is associated with a sender designated in the sender list 144. Instead of the original five notifications illustrated here, a single notification 134 remains for presentation.

The filtered notification 222 is processed by the transform module 226 to provide the voice notification data 146. In this illustration, the voice notification data 146 specifies a language, text of an announcement that provides information about the message that is to be rendered into speech, and detailed content that comprises the text of the message that is to be rendered into speech. For example, the announcement may comprise information such as the application 210 associated with the message, a name associated with the sender, and so forth.

Figure 4:
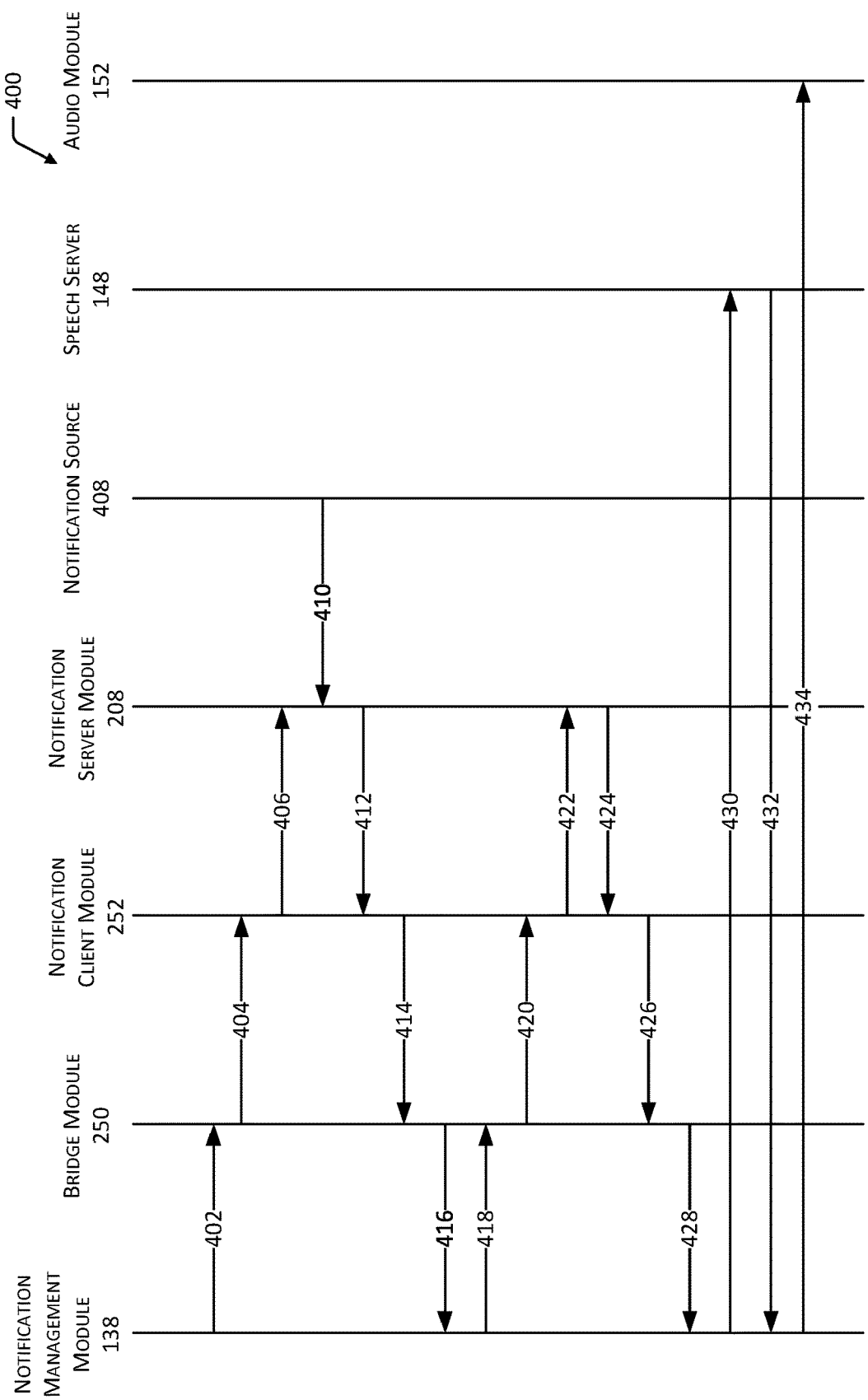
FIG. 4 depicts a flow diagram of relaying notifications through the Head Mounted Wearable Device (HMWD), according to some implementations.

FIG. 4 depicts a flow diagram 400 of relaying notifications through the HMWD 104, according to some implementations. In some implementations, the operating system module 202 may restrict the passage of data between service modules 204, applications modules 210, and so forth. In these situations, the HMWD 104 or another device external to the computing device 106 may be used to relay notifications 134 (including local notifications 206).

At 402 the notification management module 138 sends a subscription request to the bridge module 250. At 404 the bridge module 250 passes the subscription request to the notification client module 252. For example, the notification client module 252 may comprise an Apple Notification Center Service (ANCS) Client as promulgated by Apple, Inc. of Cupertino, Calif. At 406 the notification client module 252 sends the subscription request or other data requesting subscription to notifications to the notification server module 208. For example, the notification server module 208 may comprise the ANCS Server as promulgated by Apple, Inc. The notification server module 208 processes the subscription request and will provide subsequent notifications to the notification client module 252.

A notification source 408 sends at 410 a notification 134 to the notification server module 208. The notification source 408 may comprise a service module 204, application module 210, or other module or process that generates notifications 134. These may include local notifications 206.

At 412 the notification server module 208 sends information indicative of the notification to the notification client module 252. At 414 the notification client module 252 sends the information indicative of the notification to the bridge module 250, which in turn at 416 passes that information along to the notification management module 138.

At 418 the notification management module 138 sends a request for notification attributes to the bridge module 250. At 420 the request for notification attributes is sent to the notification client module 252, which at 422 passes the request on to the notification server module 208. The notification server module 208 processes the request for notification attributes and responds by sending the notification attributes to the notification client module 252 at 424.

At 426 the notification client module 252 passes the notification attributes to the bridge module 250, which in turn at 428 passes the notification attributes to the notification management module 138.

The notification management module 138 uses the notification attributes to determine the voice notification data 146. As described above, at 430 the voice notification data 146 may be sent to the speech server 148. At 432 the speech server 148 may send to the notification management module 138 the audio data 150, or a resource identifier 246 associated with the audio data 150. Once the audio data 150 has been retrieved (not shown here) at 434 the audio data 150 is provided to the audio module 152 which may then present the audio data 150. For example, the audio data 150 may be sent from the audio module 152 to the HMWD 104 for presentation on the speakers 130.

In some implementations at least a portion of the data transferred between the various modules and servers may be encrypted independent of any encryption present on the communication channel. For example, a communication channel between the HMWD 104 and the computing device 106 may be encrypted. In addition to this channel encryption, separate encryption may be used to prevent information from being accessible to other applications or module executing on the computing device 106. For example, the subscription request from the notification management module 138, the information indicative of a notification from the notification server module 208, the request for notification attributes, and the notification attributes may be encrypted.

Figure 5:
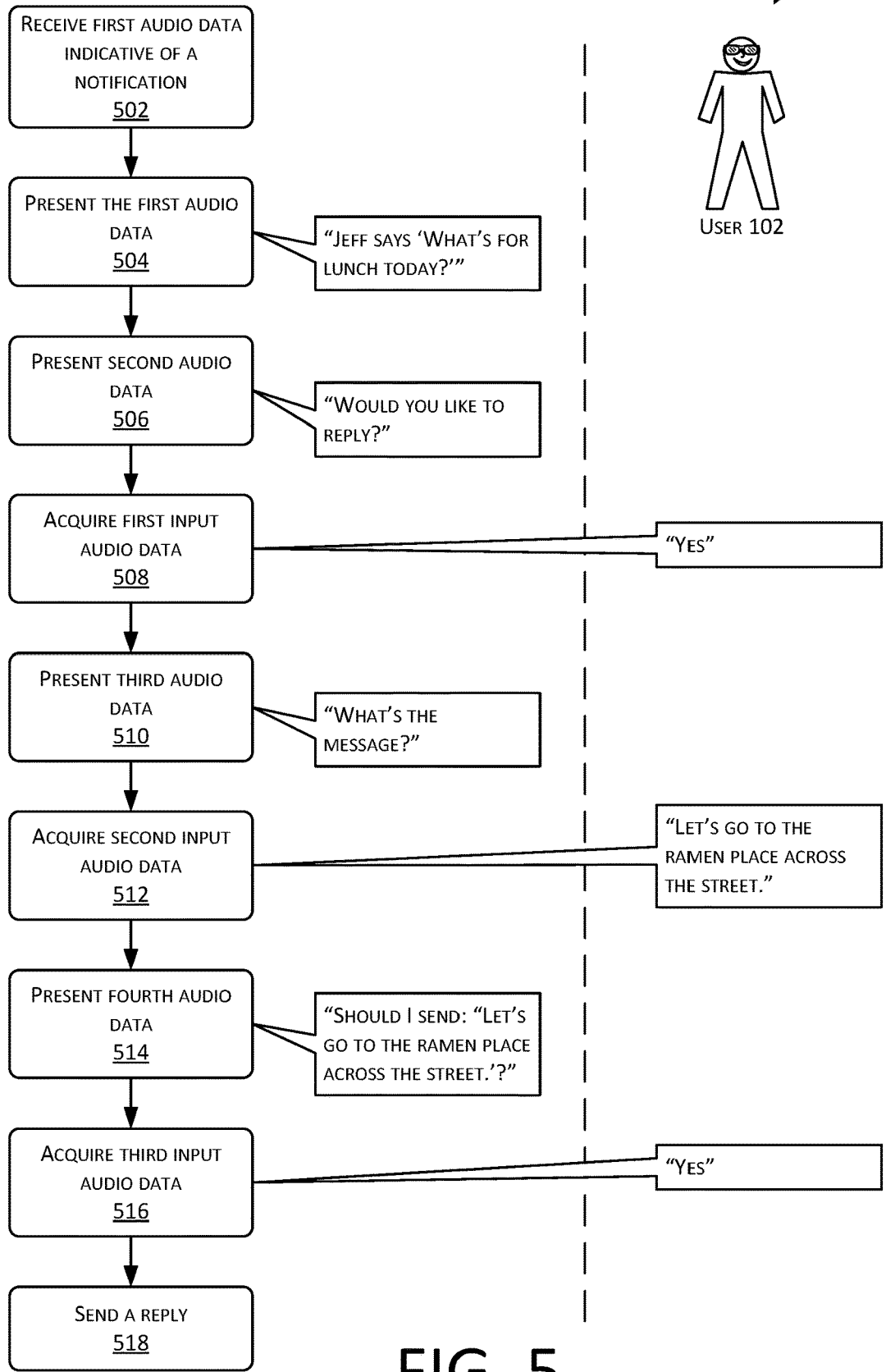
FIG. 5 depicts a multi-turn interaction between the system and the user, according to some implementations.

FIG. 5 depicts a multi-turn interaction between the system 100 and the user 102, according to some implementations. In some implementations, the system 100 may use a voice user interface (VUI) to facilitate a multi-turn interaction in which various prompts or information are presented to the user 102. The user 102 may respond to the prompts or information to perform particular actions.

At 502 first audio data 150(1) based on a notification is received at the HMWD 104. For example, the notification management module 138 may have generated the voice notification data 146 that resulted in production of the first audio data 150(1).

At 504 the first audio data 150(1) is presented. For example, the speakers 130 may play the first audio data 150(1) to present synthesized speech saying, "Jeff says 'what's for lunch today?'".

At 506 second audio data 150(2) is presented. For example, the second audio data 150(2) may comprise previously stored audio data 150. Continuing the example, prompts and basic responses like "yes" or "no" may be stored locally on the HMWD 104 or the computing device 106 and used during the interaction. In this illustration, the second audio data 150(2) presents synthesized speech saying, "Would you like to reply?".

At 508 the HMWD 104 acquires first input data 120(1). For example, the microphone 116 may be operated to acquire first audio input data 122(1). In this illustration, the first audio input data 122(1) is "Yes" as spoken by the user 102. The first audio input data 122(1) is processed to determine the first input data 120(1). For example, a neural network may be used to process the first audio input data 122(1) and determine whether the user 102 answered in the affirmative or negative. Continuing the example, the first input data 120(1) is indicative of a "Yes".

At 510 third audio data 150(3) is presented responsive to the determination of an affirmative answer. For example, the third audio data 150(3) may comprise previously stored audio data 150. In this illustration, the third audio data 150(3) presents synthesized speech saying, "What's the message?".

At 512 the HMWD 104 again acquires second input data 120(2). For example, the microphone 116 may be operated to acquire second audio input data 122(2). In this illustration, the second audio input data 122(2) is "Let's go to the ramen place across the street" as spoken by the user 102. The second audio input data 122(2) is processed to determine the second input data 120(2). For example, the second audio input data 122(2) may be sent to an external server for automated speech recognition (ASR) processing to provide input data 120 comprising text.

At 514 fourth audio data 150(4) is presented that is based at least in part on the second input data 120(2) and may include previously stored audio data 150. In this illustration, the fourth audio data 150(4) presents synthesized speech saying, "Should I send "let's got to the ramen place across the street"?". The speech servers 148 may be used to determine the fourth audio data 150(4).

At 516 the HMWD 104 acquires third input data 120(3). For example, the microphone 116 may be operated to acquire third audio input data 122(3). In this illustration, the third audio input data 122(3) is "Yes" as spoken by the user 102. The third audio input data 122(3) is processed to determine the third input data 120(3). For example, a neural network may be used to process the first input data 122(1) and determine whether the user 102 answered in the affirmative or negative. Continuing the example, the third input data 120(3) is indicative of a "Yes".

At 518 a reply is sent that is based at least in part on the input data 120 that was received. For example, a message replying to Jeff may be sent to the sender address indicated in the notification 134.

Figure 6:
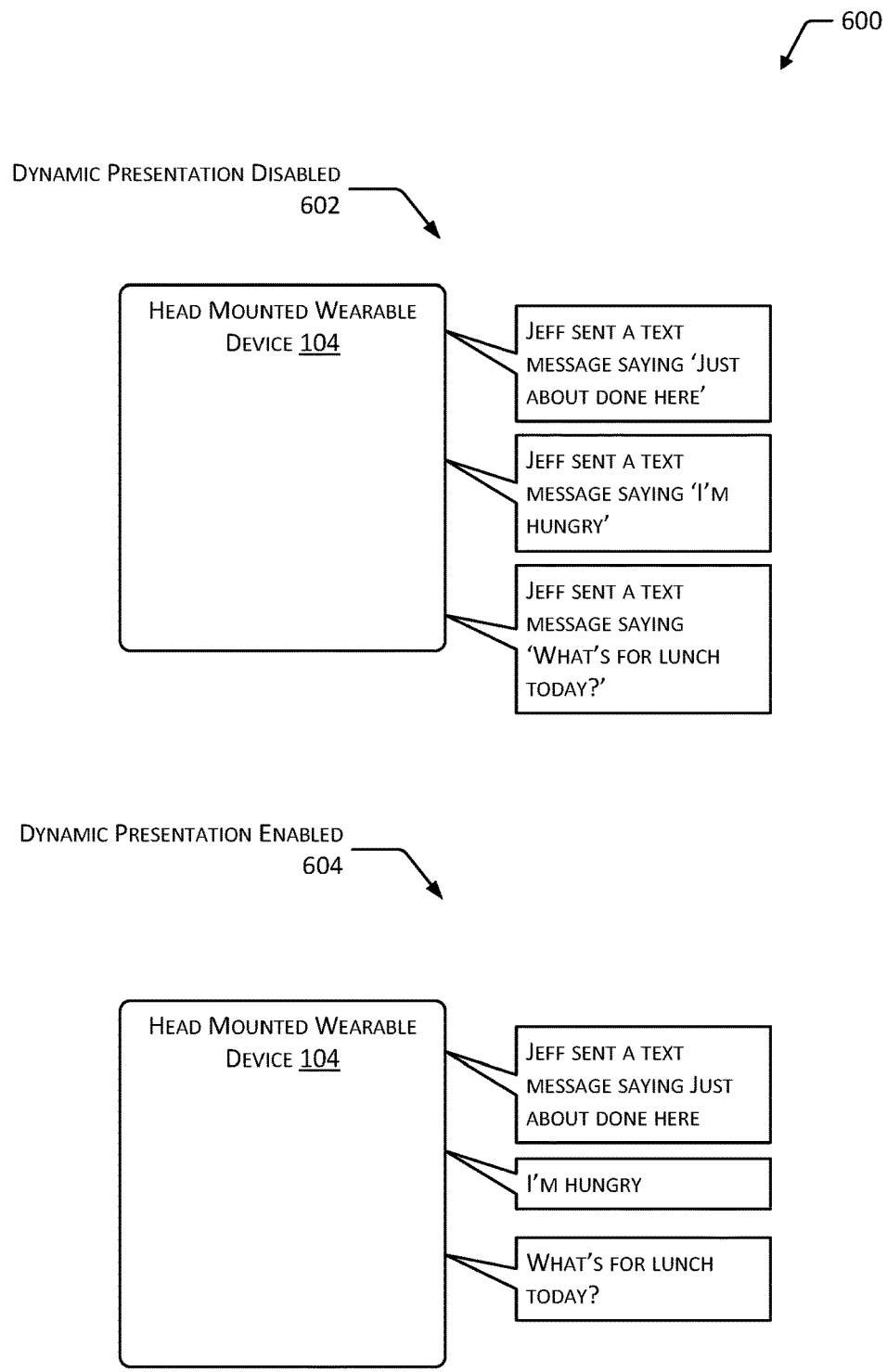
FIG. 6 depicts voice user interface output with dynamic presentation disabled and with dynamic presentation enabled, according to some implementations.

FIG. 6 depicts at 600 voice user interface output with dynamic presentation disabled 602 and with dynamic presentation enabled 604, according to some implementations. Dynamic presentation reduces the presentation of redundant or unnecessary information to the user.

In some implementations the consumption module 228 may provide at least a portion of the functionality associated with dynamic presentation. The consumption module 228 may arrange voice notification data 146 or associated audio data 150 into groups based on one or more equivalent attributes. Attributes may be equivalent if they are either identical or associated with one another. For example, two text messages sent from the same phone will share an identical sender phone number and may be deemed equivalent and grouped together. A first text message sent using SMS from a first phone number associated with the user 102(2) and a second instant message sent using a messaging application from an account name associated with the user 102(2) may be deemed equivalent and grouped together. Groups may also be formed based at least in part on time. For example, notifications 134 from equivalent senders and which have timestamps that are within a threshold time value of one another may be grouped together.

In some implementations the notification management module 138 may enque grouped notifications together with no other notifications interspersed between them. As a result, groups of notifications 134 are presented together.

In this illustration, user 102(2) "Jeff" has sent three text messages in succession to the user 102(1). These three text messages resulted in three notifications 134(1)-(3). The notification management module 138 has received these notifications 134 and determined that all three are associated with timestamps that are within threshold time of one another and have been identified as being from the same user 102(2) ("Jeff").

At 602, dynamic presentation is disabled. The resulting audio data 150 produces output from the speakers 130 of three separate sets of synthesized speech, presented in sequence, each starting with "Jeff sent a text message saying . . . ".

At 602, dynamic presentation is enabled. The resulting audio data 150 still produces output from the speakers 130 of three separate sets of synthesized speech that are presented in sequence. The first set of synthesized speech includes the preface "Jeff sent a text message saying" while the second and third sets of synthesized speech omit the preface. As a result, the output avoids presenting redundant information, improving user comprehensibility and reducing the time to present the synthesized speech.

Figure 7:
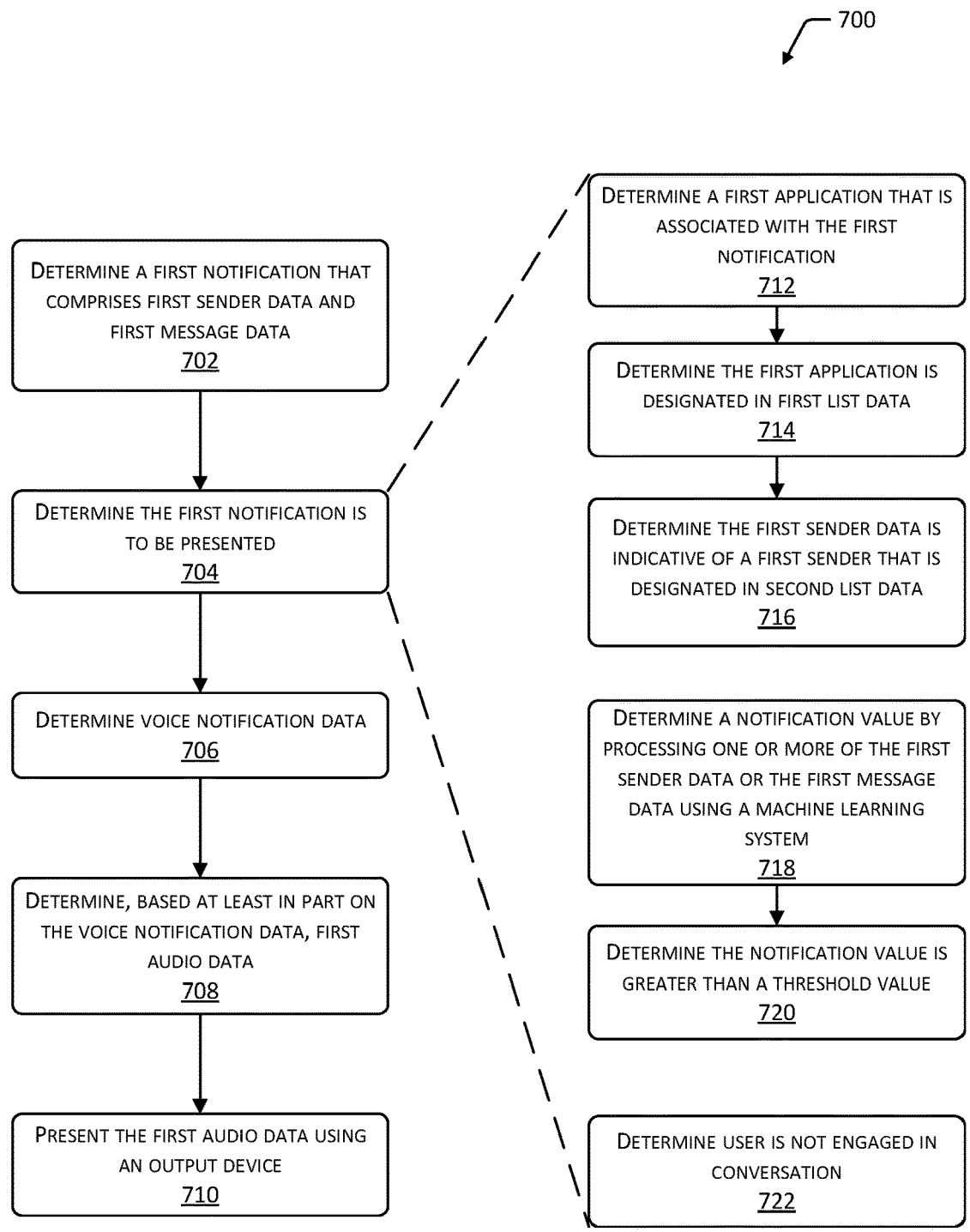
FIG. 7 is a flow diagram of a process to selectively present output based on notifications, according to some implementations.

FIG. 7 is a flow diagram 700 of a process to selectively present output based on notifications, according to some implementations. The process may be implemented at least in part by one or more of the HMWD 104, the computing device 106, one or more servers, and so forth.

At 702 a first notification 134 is determined that comprises first sender data and first message data. For example, the first notification 134 may be received from a communication server 136. The first notification 134 may include, or be associated with, first sender data indicative of the sender of a message. For example, the first sender data may comprise caller identification (ID), a from address in an email, and so forth. The first message data may comprise one or more of text, audio, image data, or other information.

At 704 the first notification 134 is determined to be presented. In one implementation the first notification 134 may be assessed using filter data 140. At 712 a first application that is associated with the first notification 134 may be determined. For example, the first notification 134 may include data indicative of which application module 210 it is associated with. This data may be compared with previously stored data that associates particular data with particular applications. For example, the first notification 134 may include header data that designates an application.

At 714 the first application is determined to be designated in first list data, such as the application list 142. For example, data in the first notification 134 may be compared to previously stored data in the first list data to determine the application associated with that data.

At 716 the first sender data is determined to be indicative of a first sender that is designated in second list data such as the sender list 144. For example, the first sender data may be compared to determine if it matches previously stored data in the second list data.

In another implementation, at 718 a notification value is determined by processing one or more of the first sender data or the first message data using a machine learning system. For example, a neural network may be trained to distinguish between notifications 134 of interest to the user 102 and those which are not. At 720 the notification value is determined to be greater than a threshold value. Based on this determination, the notification 134 will be presented.

In yet another implementation, at 720 a determination is made that the user 102 is not engaged in conversation. For example, a voice activity detection module may provide as output data indicative of whether the user 102 has been speaking at a given time. A user 102 may be deemed to have spoken if one or more values associated with audio input from a microphone 116 associated with the HMWD 104 exceed a threshold. For example, if the zero crossing rate (ZCR) of the audio input exceeds a threshold value, speech may be deemed to be detected. In another example, detection of whether speech is detected may be based on energy associated with the audio input. If the energy exceeds a threshold value, speech may be deemed to be detected. If the user 102 is determined to have not spoken within a threshold period of time, the user 102 may be determined to not be engaged in a conversation. If the user has been determined to have spoken within the threshold period of time, the user 102 may be determined to be engaged in conversation.

In other implementations other data may be used to determine whether the user 102 is engaged in a conversation with someone else. For example, the state data 132 may indicate an RTC is in progress, such as a telephone call. If the RTC is determined to be in progress, the user 102 may be deemed to be in conversation. In another example, data from an inertial measurement unit (IMU) on the HMWD 104 may indicate that the user 102 is moving. If the movement exceeds a threshold value, the user 102 may be deemed to be in conversation.

The consumption module 228 may use the data indicative of whether the user 102 is in a conversation to control how output based on notifications is presented. For example, if the user 102 is deemed to be in conversation, the consumption module 228 may discard all notifications, hold notifications in the notification queue 230 for later distribution, determine a summary of pending notifications in the notification queue 230 for presentation, and so forth.

At 706 voice notification data 146 is determined. For example, the transform module 226 may process a filtered notification 224 to determine the voice notification data 146. The voice notification data 146 may comprise text that is indicative of one or more of the first application, the first sender, or at least a portion of the first message data. For example, a first phrase associated with the first application may be retrieved and a first name associated with the first sender may be retrieved. Continuing the example, the voice notification data 146 may be determined by concatenating the first name, the phrase, and at least a portion of the first message data.

At 708 based at least in part on the voice notification data 146, first audio data 150(1) is determined. For example, the voice notification data 146 may be sent to the speech server 148 which then returns the first audio data 150(1).

At 710 the first audio data 150(1) is presented using an output device 126. For example, the first audio data 150(1) may be sent to the HMWD 104 for presentation by a speaker 130 on the HMWD 104. In other implementations other devices may be used to present output based on notifications 134. For example, an internet enabled speaker may be used to present the first audio data 150(1).

In some implementations, the output device used may be determined based at least in part on the first notification 134. For example, a lookup table or other data structure may specify that the first application is designated to use a particular output device. Based on the first application associated with the first notification 134, the designated output device may be retrieved from the lookup table.

Instead of, or in addition to, the audio data 150, in some implementations visual output 156 may be provided as well. An output color value may be determined based on one or more of the sender data or the message data. For example, the user 102(1) may have specified a particular color, such as "green", is associated with the sender "Jeff". The computing device 106 may send a command to the HMWD 104 to operate the visual indicator device 128 to produce light of a color specified by the output color value. Continuing the example, before or during presentation of the first audio data 150(1), the visual indicator device 128 may illuminate with a green light. In another example, at least a portion of the data in the message data may be associated with a particular output color value. For example, the word "work" may be associated with the color "amber".

In other implementations, the functions of different modules may be omitted, combined, or separated into other modules. For example, the preprocessor module 212 may be omitted and the filter module 222 may remove the unwanted notifications.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Specific physical embodiments as described in this disclosure are provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

What is claimed is:

1. A method comprising:
   determining a first notification that comprises first sender data and first message data;
   determining first stored data that includes a first template, wherein the first template specifies:
      a first portion of the first notification as indicative of a first application;
      a second portion of the first notification as the first sender data; and
      a third portion of the first notification as the first message data;
   determining that the first application is associated with the first notification by comparing the first notification to the first portion specified in the first template of the first stored data;
   determining that the first application is designated in second stored data indicative of one or more applications;
   determining that the first sender data is indicative of a first sender that is designated in third stored data indicative of one or more senders;
   generating first text that is indicative of one or more of: the first application, the first sender, or at least a portion of the first message data;
   determining, based at least in part on the first text, first audio data;
   determining an output device associated with the first notification;
   sending the first audio data to the output device;
   receiving a second notification that comprises second message data and second sender data, wherein the second sender data is indicative of a second sender; and determining that the first notification is associated with a first time and the second notification is associated with a second time, wherein the first time is within a threshold time of the second time.

2. A system comprising:
one or more memories storing computer-executable instructions; and
one or more hardware processors to execute the computer-executable instructions to:
determine a first notification that comprises first sender data and first message data, wherein the first notification is associated with a first application;
determine that the first application is designated in first data;
determine that the first sender data is indicative of a first sender designated in second data indicating one or more senders;
based on the first application being designated in the first data and the first sender being designated in the second data, determine third data that is indicative of one or more of: the first application, the first sender, or at least a portion of the first message data;
determine that one or more words in a first set of words are present in the third data;
determine fourth data by removing the one or more words from the third data;
determine audio data based on the fourth data;
store the audio data in association with a resource identifier;
receive a request that includes the resource identifier; and
send the audio data to an output device.

3. The method of claim 1, the generating the first text comprising:
retrieving a phrase associated with the first application;
retrieving a name associated with the first sender; and
concatenating the name, the phrase, and the at least a portion of the first message data.

4. The method of claim 1, the determining the output device associated with the first notification comprising:
retrieving, based on the first application, data indicative of the output device.

5. The method of claim 1, wherein the output device comprises a speaker associated with a head-mounted wearable device (HMWD), the method further comprising:
after sending at least a portion of the first audio data, sending second audio data indicative of a prompt to reply to the first notification;
receiving, from the HMWD, first audio input data acquired using a microphone associated with the HMWD; and
determining reply data based at least in part on the first audio input data, wherein the reply data is addressed using the first sender data.

6. The method of claim 1, wherein the output device comprises a speaker associated with a head-mounted wearable device (HMWD), the method further comprising:
generating, using a touch sensor associated with the HMWD, first touch input data indicative of input by a user; and
responsive to the first touch input data, performing one or more of:
stopping the sending of the first audio data to the output device,
sending a command to the output device to stop presentation of output,
sending the first audio data to the output device again, or
sending a reply message to the first sender.

7. The method of claim 1, further comprising:
determining an output color value based on one or more of the first sender data or the first message data; and
sending a command to operate a light emitting diode (LED) to produce light of a color specified by the output color value.

8. The method of claim 1, further comprising:
acquiring audio input data using a microphone;
determining the audio input data is not indicative of speech; and
wherein the sending the first audio data is responsive to the determining the audio input data is not indicative of speech.

9. The method of claim 1, further comprising:
determining a second application that is associated with the second notification;
determining the second sender is equivalent to the first sender;
determining second text that is indicative of at least a portion of the second message data;
determining, based at least in part on the second text, second audio data; and
sending the second audio data to the output device.

10. The method of claim 9, the determining the second sender is equivalent to the first sender comprising:
determining the first sender data matches a first stored contact; and
determining the second sender data matches the first stored contact.

11. The method of claim 1, further comprising:
determining a second application that is associated with the second notification;
determining second text that is indicative of one or more of the second application, the second sender, or at least a portion of the second message data;
determining, for the first text and the second text, that one or more of:
the first application is equivalent to the second application,
the first sender is equivalent to the second sender, or
the first message data is equivalent to the second message data;
determining first data based on a difference between the first text and the second text, wherein an indication of one or more of: the first application, the first sender, or the first message data is omitted from the first data;
determining, based at least in part on the first data, second audio data; and
sending the second audio data to the output device.

12. The method of claim 11, the determining the first application is equivalent to the second application comprising: retrieving fourth stored data indicative of the first application; and
the determining the first sender is equivalent to the second sender comprising: retrieving one or more of the fourth stored data or fifth stored data indicative of the first sender.

13. The method of claim 1, further comprising:
sending the first text to a first set of computing devices;
determining, using the first set of computing devices, a first set of words;
determining, using the first set of computing devices, that one or more words in the first set of words are present in the first text;

generating second text by removing the one or more words from the first text;
determining, using the first set of computing devices, the first audio data based on the second text;
storing, at a location associated with a resource identifier, the first audio data on a second set of computing devices;
sending data indicative of the resource identifier to a first computing device of the first set of computing devices;
receiving, with the second set of computing devices, a request comprising the resource identifier; and
sending the first audio data to the first computing device.

14. The method of claim 1, further comprising:
determining, by using the first text as input to a text to speech system, the first audio data.

15. The method of claim 1, further comprising:
determining a first set of notifications at a first computing device;
determining first notification blocking data indicative of one or more of:
  a first service executing at least in part on the first computing device,
  an operating system executing at least in part on the first computing device, or
  repeated notifications by a second service executing on the first computing device, wherein the second service is associated with a count of messages per unit time that exceeds a threshold value; and
determining a second notification based on the first notification and the first notification blocking data.

16. The method of claim 1, further comprising:
sending, from the first application executing on a first computing device to a second application executing on a second computing device, a first request to subscribe to notifications from a third application executing on the first computing device;
sending the first request from the second application to a fourth application executing on the second computing device;
sending the first request from the fourth application to the third application;
receiving the first notification at the third application;
sending first data indicative of the first notification from the third application to the fourth application;
sending the first data from the fourth application to the second application;
sending the first data from the second application to the first application;
sending second data responsive to the notification, wherein the second data is sent from the first application to the second application;
sending the second data from the second application to the fourth application;
sending the second data from the fourth application to the third application;
sending at least a portion of the first notification from the third application to the fourth application;
sending the at least a portion of the first notification from the fourth application to the second application; and
sending the at least a portion of the first notification from the second application to the first application.

17. The method of claim 16, further comprising:
encrypting one or more of:
  the first request,
  the first data,
  the second data, or
  the at least a portion of the first notification.

18. A system comprising:
a first device comprising:
  a first communication interface;
  a second communication interface;
  one or more memories storing first computer-executable instructions; and
  one or more hardware processors to execute the first computer-executable instructions to:
    determine a first notification that comprises first sender data and first message data;
    determine that output based on the first notification is to be presented;
    access a first template associated with the first notification, wherein the first template specifies:
      a first portion of the first notification as indicative of a first application,
      a second portion of the first notification as the first sender data, and
      a third portion of the first notification as the first message data;
    determine, based on the first notification and the first template, first data comprising text that is indicative of one or more of the first application, at least a portion of the first sender data, or at least a first portion of the first message data;
    determine first audio data based at least in part on the first data;
    send, using the second communication interface, the first audio data to a wearable device;
    receive a second notification that comprises second sender data and second message data;
    determine one or more of:
      the first application is equivalent to a second application associated with the second notification;
      a first sender indicated by the first sender data is equivalent to a second sender indicated by the second sender data; or
      the at least a first portion of the first message data is equivalent to at least a second portion of the second message data;
    determine the first notification is associated with a first time and the second notification is associated with a second time, wherein the first time is within a threshold time of the second time;
    determine second data comprising text that is indicative of at least a third portion of the second message data;
    determine second audio data based at least in part on the second data; and
    send, using the second communication interface, the second audio data to the wearable device.

19. The system of claim 18, the instructions to determine that the output based on the first notification is to be presented comprising instructions to:
determine the first application is designated in third data indicative of one or more applications; and
determine the first sender is designated in fourth data indicative of one or more senders.

20. The system of claim 2, further comprising computer-executable instructions to:
determine a template associated with a second notification that comprises the first sender data and the first message data, wherein the template specifies:
  a first portion of the first notification as indicative of the first application;

a second portion of the first notification as the first sender data; and a third portion of the first notification as the first message data; and determine the first notification based on the second notification and the template.

21. The system of claim 2, wherein the output device includes one or more speakers.

22. The system of claim 2, further comprising computer-executable instructions to:

determine a phrase associated with the first application; and determine a name associated with the first sender;

wherein the third data is determined at least in part by concatenating the name, the phrase, and the at least a portion of the first message data.

23. The system of claim 2, further comprising computer-executable instructions to:

receive a second notification that comprises second sender data indicative of a second sender and second message data; and determine the first notification is associated with a first time and the second notification is associated with a second time, wherein the first time is within a threshold time of the second time.

24. The method of claim 1, further comprising:

determining one or more of:

the first application is equivalent to a second application associated with the second notification;

the first sender indicated by the first sender data is equivalent to the second sender indicated by the second sender data; or at least a first portion of the first message data is equivalent to at least a second portion of the second message data.

* * * * *